Figure 1:
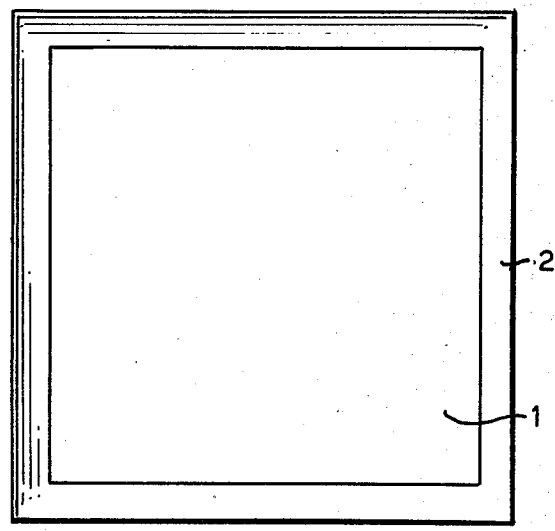

Jan. 6, 1959 G. J. DE JONG 2,867,575
SELECTIVE ION-PERMEABLE MEMBRANES
Filed Aug. 27, 1954

Inventor
Geert J. de Jong
By Cushman, Darby & Cushman
Attorneys

United States Patent Office 2,867,575
Patented Jan. 6, 1959

2,867,575

SELECTIVE ION-PERMEABLE MEMBRANES

Geert J. de Jong, Amsterdam, Netherlands, assignor to Stamicarbon N. V., Heerlen, Netherlands Application August 27, 1954, Serial No. 452,729

Claims priority, application Netherlands August 29, 1953

1 Claim. (Cl. 204—296)

The present invention relates to selective ion-permeable membranes consisting of ion exchange materials, suitable for the electrodialysis of liquids and more particularly for the electrodialytical desalting of liquids such as brackish or saline water, and to processess for their preparation.

These selective ion-permeable membranes may be prepared by one of the following methods: (a) by starting from a sheet or foil consisting of a substance having no ionogenic groups and converting this by a chemical reaction into a positive, i. e. anion-permeable, or negative, i. e. cation-permeable, selective membrane; (b) by forming a synthetic material having ion-exchanging properties into the desired shape by a moulding or rolling treatment; (c) by preparing such a synthetic material in the desired shape by polymerization or poly-condensation. During the preparation a reinforcement, e. g., consisting of a fabric of an organic or inorganic fibre, may be provided, should this be necessary.

A drawback attached to these selective membranes is that in many cases their mechanical strength is comparatively small, as the presence of ionogenic groups has a deleterious effect on the foil-forming properties of the macromolecular substances. This becomes especially apparent in many types of foils if they are exposed to air and thus dry up. In that case they easily crumble or crack. Such exposure to air notably occurs with the marginal parts of membranes applied in dialysing apparatus in which they are fixed between frames whereas their centre parts only are moistened by the liquids to be treated. In apparatus in which the selective membranes are combined into packs in which the edges of successive membranes, if necessary with spacers interposed, are pasted or pressed against each other, it is often found as a further disadvantage that the macromolecular substances having ion-exchange properties sometimes adhere rather weakly as a result of which leakage will occur, notably on the edges of the packs. The hydrophylic properties of the said substances tend to promote leaking.

The main object of the invention is to provide selective ion-permeable membranes of the kind described wherein those parts that will be exposed to air when in use do not show the deleterious crumbling or cracking hereinbefore referred to.

A further object of the invention is to provide selective ion-permeable membranes that are especially suited for combination into packs.

A still further object of the invention is to provide selective ion-permeable membranes that are especially suited for being fixed between frames in dialysing apparatus without danger of damage to the membrane or to leaking through of the liquids treated.

Further objects will appear hereinafter and in the appertaining claim.

According to the invention, selective ion-permeable membranes of the kind described are at least partly provided with a margin consisting of a hydrophobic macromolecular substance capable of forming foils of great mechanical strength.

Preferably, the hydrophobic macromolecular substance applied for the margin is that substance from which the substance of the liquid-permeable part of the membrane may be prepared by means of a chemical reaction comprising introducing ionogenic groups therein, a firm union between membrane and margin then being ensured in view of the close relation between the substances applied and the preparation technique being simplified.

Generally, those parts of the membrane are provided with a margin according to the invention as would be subject to drying up when the membrane is in use. The hydrophobic character of the material applied for the margins prevents drying and the subsequent phenomena of crumbling or cracking, thus avoiding leakage in those cases where the membrane is fixed between frames or where more membranes are combined into packs.

If desired, the margins may be made thicker than the membrane proper and there is provided, in addition, a material reinforcement of the marginal parts of the membrane, which is of advantage in those cases where the said marginal parts would be subject to mechanical wear, e. g. in those cases where the membrane is fixed into a frame as hereinbefore mentioned.

Preferably, the invention is applied to membranes wherein a reinforcement is used, the combination of reinforcement and margin then forming one strong supporting unit for the membrane proper.

The preparation of the membranes according to the invention may be achieved in various ways in close relation to the various known ways of membrane formation.

If the manufacture is started from a foil consisting of a hydrophobic macromolecular substance into which ionogenic groups are subsequently introduced by a chemical reaction, a margin may be obtained by protecting a corresponding part of the foil during the treatment or keeping such part clear of the liquid by means of which the treatment is carried out.

Figure 2:
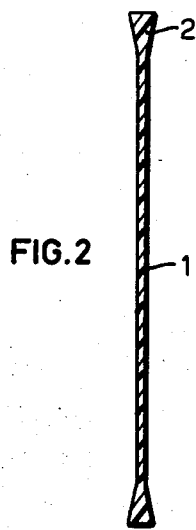

Alternatively, marginal parts of the said foil may be taken thicker than the other parts, so that if the foils are treated completely a core will remain in said marginal parts which has not been affected by the chemical agent, there being thus obtained membranes which over part of their width only i. e. the middle part, consist of the hydrophobic substance hereinbefore mentioned. This is illustrated by the drawings wherein Figure 1 represents an elevational view of a membrane according to the invention and Figure 2 is a cross-sectional view thereof. As shown therein, the membrane comprises the barrier portion 1 and the margin portion 2.

In the continuous preparation of, e. g., selective cation-permeable membranes of sulphonated polyethylene, in which a strip of polyethylene is passed continuously through chlorosulphonic acid and subsequently washed in countercurrent (cf. co-pending patent application Serial No. 452,728, filed on even date herewith), the edges of the strip may e. g. be turned up, after which the strip is passed through a shallow trough containing chlorosulphonic acid in such a manner that margins remain above the surface. Before, during or after the washing treatment the strip may then be flattened again, e. g., by being passed between two pressure rolls.

According to the process of Serial No. 452,728, the polyethylene strip or film may be treated with chlorosulphonic acid at, for example, a temperature between 0° and 50° C., preferably between 20° and 40° C. The period for treating the polyethylene varies with the wall thickness of the film. For example, with a wall thickness of 0.1 mm., the treatment with the acid may be carried out for 8 to 12 hours at 20° C. while at 35° C., a 2–3 hour treatment may be used. In lieu of substantially pure sulphonic acid, mixtures of chlorosulphonic acid and concentrated sulphuric acid or oleum may be used.

As described in said Serial No. 452,728, the process is carried out in the dry state and in the absence of a catalyst until the electrical resistance per square decimeter of permeable wall area of said film is below 1Ω. Thus, according to the present invention, the membrane is prepared by sulphonating a film of polyethylene by treating same with chlorosulphonic acid in the dry state at a temperature of between 0° and 50° C., and in the absence of a catalyst, until the electrical resistance per square decimeter of permeable wall area of said article is below 1Ω, while protecting a margin portion of the film from the sulphonation whereby the resulting membrane consists essentially of sulphonated polyethylene film with an integral reenforcing margin of unsulphonated polyethylene.

In case the membrane is formed by moulding or rolling a macromolecular substance with ion-exchange properties, or by preparing such substance in the desired shape by polymerization or polycondensation, a marginal border may afterwards be attached to the membrane consisting of a hydrophobic macromolecular substance capable of forming foils of great mechanical strength or the membrane may be formed within such a border. The use of a reinforcement is very suitable in this case.

E. g., to prepare from a macromolecular substance containing tertiary sulphonium groups a good and mechanically strong selective anion-permeable membrane a reinforcement of Saran gauze may be provided with a border of polyvinyl chloride. Subsequently the condensing reaction mixture is poured out into the centre part and uniformly distributed by a simple rolling treatment, care being taken that the mixture flows just over the edge of the polyvinyl chloride on all sides.

It is also possible to roll or cast around the membrane, before this has condensed completely, a marginal border of a resin which has likewise not yet condensed completely, said resin comprising as one of its condensing components a substance which is also applied in the condensation reaction for the formation of the membrane and subsequently allowing the condensation to proceed. Also in this case care should be taken to ensure a good connection between the border and the centre part.

With some apparatus for electrodialysis it is desirable to provide a membrane with two or more openings, in order to provide a passage for the liquid to be treated or for the rinsing liquid. It is advantageous to locate said openings in the margin or border of a membrane according to the invention. If the membrane is formed in situ the openings may, if necessary, be provided with a separate border in the same manner as is employed for the outer border.

I claim:

A process for producing a selective cation permeable membrane having an integral reenforced margin portion, which comprises sulphonating a film of polyethylene by treating same with chlorosulphonic acid in the dry state at a temperature between 0° and 50° C., and in the absence of a catalyst until the electrical resistance per square decimeter of permeable wall area of said article is below 1Ω, while protecting a margin portion thereof from said sulphonation whereby said membrane consists essentially of a film of sulphonated polyethylene with an integral reenforcing margin of unsulphonated polyethylene.

References Cited in the file of this patent

UNITED STATES PATENTS

| | | |
|---|---|---|
| 1,181,549 | Shriver | May 2, 1916 |
| 1,360,541 | Levin | Nov. 30, 1920 |
| 1,831,406 | Beckman | Nov. 10, 1931 |
| 2,636,851 | Juda et al. | Apr. 28, 1953 |